US012652126B2

(12) United States Patent
Nhan et al.

(10) Patent No.: US 12,652,126 B2
(45) Date of Patent: Jun. 9, 2026

(54) DETERMINING MESSAGE REPETITIONS IN TELECOMMUNICATION SYSTEMS

(71) Applicant: Nokia Technologies Oy, Espoo (FI)

(72) Inventors: Nhat-Quang Nhan, Massy (FR); Alessio Marcone, Munich (DE); Marco Maso, Massy (FR); Amir Mehdi Ahmadian Tehrani, Munich (DE)

(73) Assignee: Nokia Technologies Oy, Espoo (FI)

( * ) Notice: Subject to any disclaimer, the term of this patent is extended or adjusted under 35 U.S.C. 154(b) by 369 days.

(21) Appl. No.: 18/347,870

(22) Filed: Jul. 6, 2023

(65) Prior Publication Data

US 2024/0089034 A1 Mar. 14, 2024

(30) Foreign Application Priority Data

Sep. 9, 2022 (FI) ..................................... 20225785

(51) Int. Cl.
*H04W 4/00* (2018.01)
*H04L 1/08* (2006.01)
*H04W 40/02* (2009.01)

(52) U.S. Cl.
CPC .............. *H04L 1/08* (2013.01); *H04W 40/02* (2013.01)

(58) Field of Classification Search
CPC .......... H04L 1/08; H04L 1/189; H04W 40/02; H04W 74/0841; H04B 7/06952
USPC .................................................. 370/329, 330
See application file for complete search history.

(56) References Cited

U.S. PATENT DOCUMENTS

| | | | |
|---|---|---|---|
| 11,310,836 B2 | 4/2022 | MolavianJazi et al. | |
| 2017/0141833 A1 | 5/2017 | Kim et al. | |
| 2020/0275457 A1* | 8/2020 | Hmimy | H04W 72/51 |
| 2020/0329506 A1 | 10/2020 | Liu et al. | |
| 2021/0076384 A1 | 3/2021 | MolavianJazi et al. | |
| 2021/0392679 A1 | 12/2021 | Kim et al. | |
| 2022/0046726 A1 | 2/2022 | Taherzadeh Boroujeni et al. | |
| 2022/0061097 A1 | 2/2022 | Kwak et al. | |

(Continued)

FOREIGN PATENT DOCUMENTS

| | | |
|---|---|---|
| WO | 2021/231852 A2 | 11/2021 |
| WO | 2022/064462 A1 | 3/2022 |

OTHER PUBLICATIONS

Extended European Search Report received for corresponding European Patent Application No. 23186333.3, dated Feb. 15, 2024, 7 pages.

(Continued)

*Primary Examiner* — Chuong T Ho
(74) *Attorney, Agent, or Firm* — Lippes Mathias LLP

(57) ABSTRACT

There is provided a method and apparatus for receiving, from a network node, a configuration being indicative of at least one first threshold value for distinguishing between numbers of repetition of transmission, and at least one offset value for the at least one first threshold. And further for measuring power values of synchronization signal block beams; selecting a beam based on the measured power values; determining a number of repetitions of transmission of a first message based on at least a mapping between number of repetitions and power values of synchronization signal block beams, the at least one first threshold value, the at least one offset value, and at least one condition; and transmitting, to the network node, the first message using the determined number of repetitions on the selected beam.

18 Claims, 11 Drawing Sheets

(56) References Cited

U.S. PATENT DOCUMENTS

| | | | | |
|---|---|---|---|---|
| 2022/0150986 | A1 | 5/2022 | Shih et al. | |
| 2022/0183082 | A1 | 6/2022 | Kim et al. | |
| 2023/0036727 | A1* | 2/2023 | Gebremariam | H04W 36/322 |
| 2023/0037588 | A1* | 2/2023 | Taherzadeh Boroujeni | |
| | | | | H04W 74/0833 |
| 2023/0060894 | A1* | 3/2023 | Rastegardoost | H04B 7/0695 |
| 2023/0147122 | A1* | 5/2023 | Canonne-Velasquez | |
| | | | | H04L 5/0035 |
| | | | | 370/329 |
| 2025/0097981 | A1* | 3/2025 | Matsumura | H04W 74/0833 |
| 2025/0267729 | A1* | 8/2025 | Taherzadeh | H04W 74/0841 |

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211, V17.1.0, Mar. 2022, pp. 1-250.

"3rd Generation Partnership Project; Technical Specification Group Radio Access Network; Evolved Universal Terrestrial Radio Access (E-UTRA); Radio Resource Control (RRC); Protocol specification (Release 17)", 3GPP TS 36.331, V17.0.0, Mar. 2022, pp. 1-1119.

"New WI: Further NR coverage enhancements", 3GPP TSG RAN Meeting #94e, RP-213579, Agenda: 8.6.1, China Telecom, Dec. 6-17, 2021, 5 pages.

European Application No. 22198958.5, "Apparatus, Method and Computer Program", filed on Sep. 30, 2022, pp. 1-25.

Narayanan et al., "ADAM: An Adaptive Access Mechanism for NB-IoT Systems in the 5G Era", IEEE Access, vol. 9, Aug. 3, 2021, pp. 109915-109931.

Jiang et al., "RACH Preamble Repetition in NB-IoT Network", IEEE Communications Letters, vol. 22, No. 6, Jun. 2018, pp. 1244-1247.

Office action received for corresponding Finnish Patent Application No. 20225785, dated Jan. 27, 2023, 10 pages.

* cited by examiner

310

UE

320

Network node 330 configuration: RSRP threshold and offset

Beam selection    332

Determine
number of
repetitions    334

336 Msg1 using the determined number of repetitions

Figure 10:
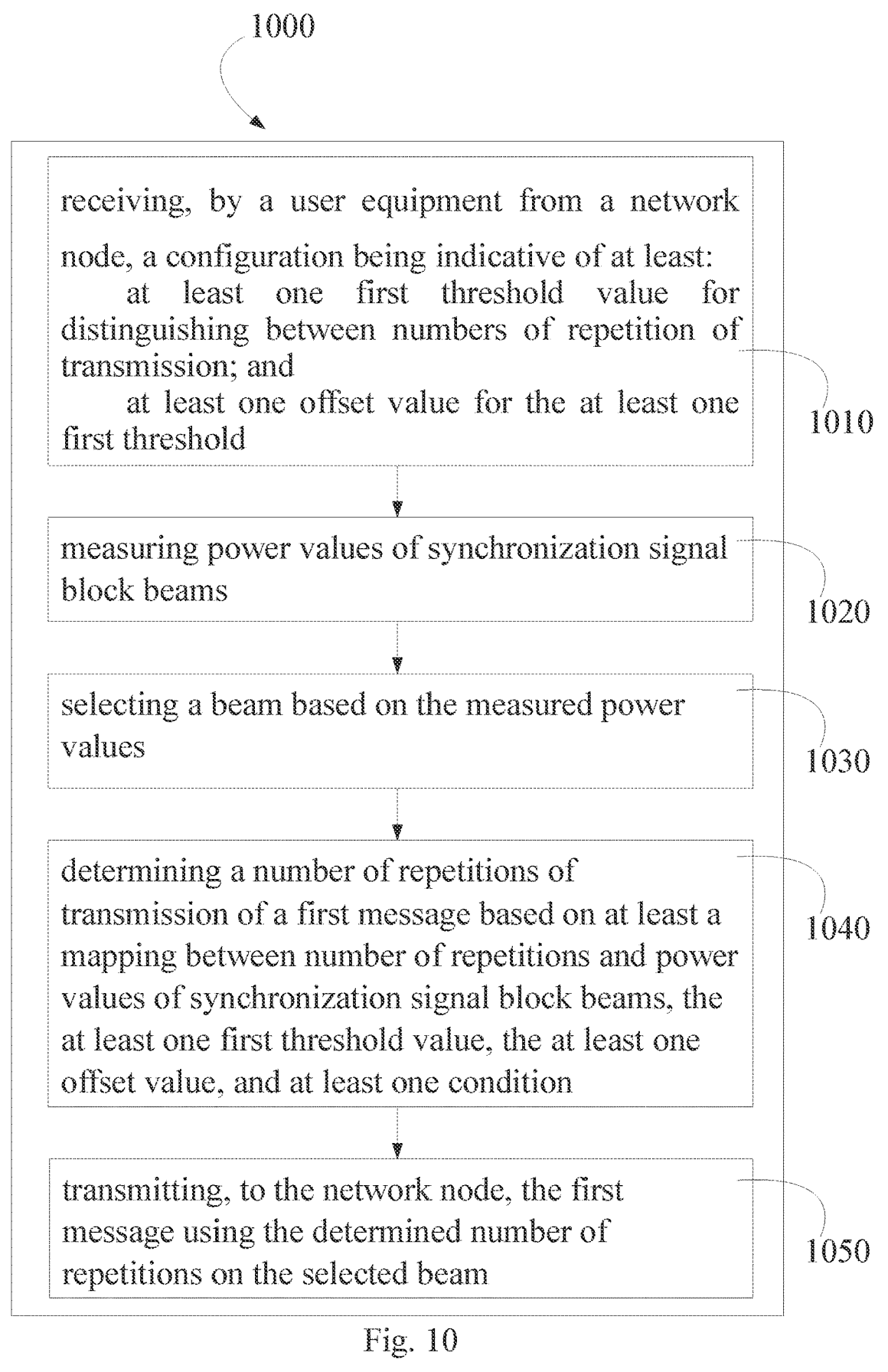

1000 receiving, by a user equipment from a network node, a configuration being indicative of at least:
    at least one first threshold value for distinguishing between numbers of repetition of transmission; and
    at least one offset value for the at least one first threshold

1010 measuring power values of synchronization signal block beams

1020 selecting a beam based on the measured power values

1030 determining a number of repetitions of transmission of a first message based on at least a mapping between number of repetitions and power values of synchronization signal block beams, the at least one first threshold value, the at least one offset value, and at least one condition

1040 transmitting, to the network node, the first message using the determined number of repetitions on the selected beam

1100 transmitting, by a network node to a user equipment, a configuration being indicative of at least:

Figure 11:
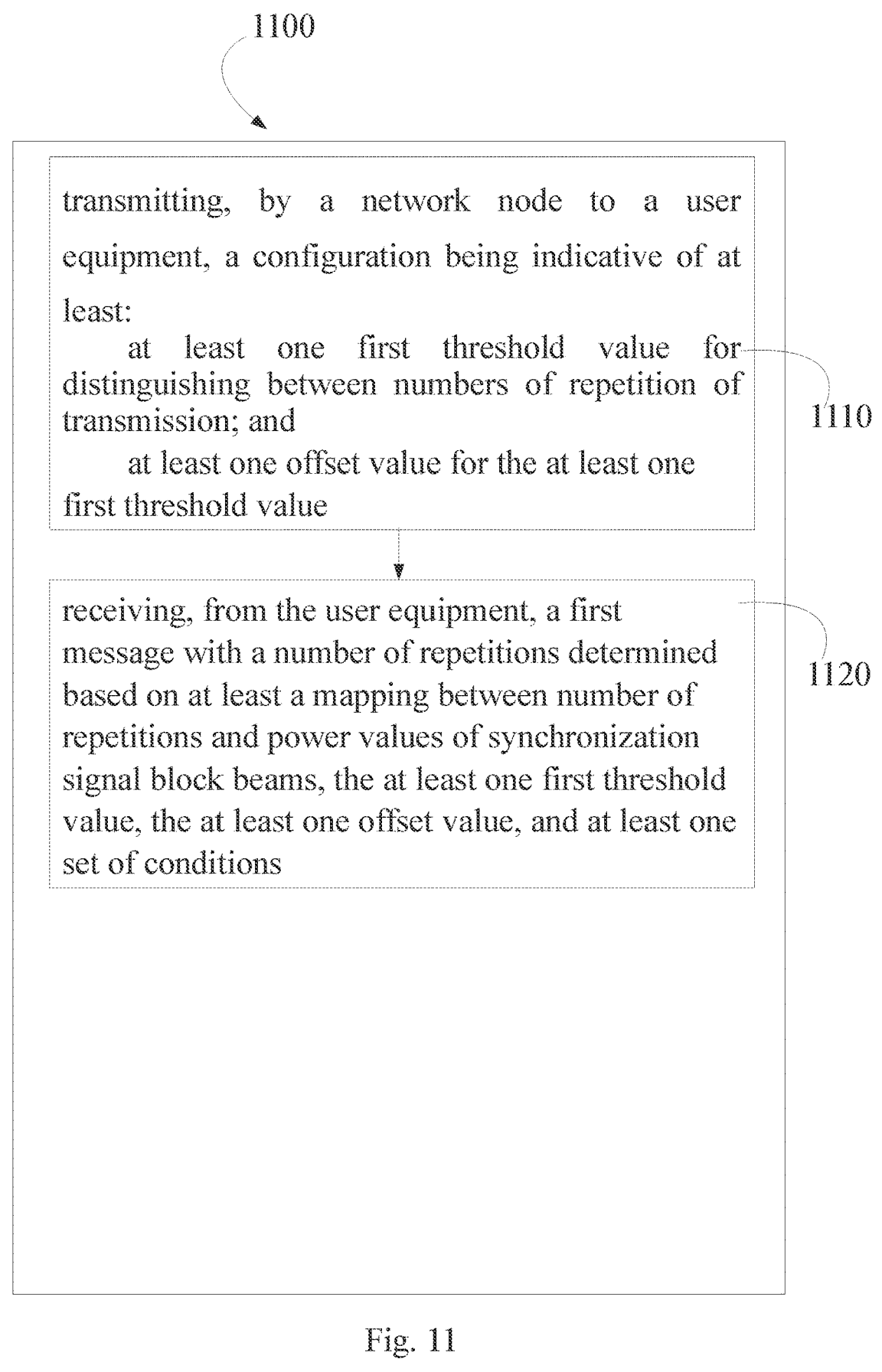

at least one first threshold value for distinguishing between numbers of repetition of transmission; and at least one offset value for the at least one first threshold value

1110 receiving, from the user equipment, a first message with a number of repetitions determined based on at least a mapping between number of repetitions and power values of synchronization signal block beams, the at least one first threshold value, the at least one offset value, and at least one set of conditions

DETERMINING MESSAGE REPETITIONS IN TELECOMMUNICATION SYSTEMS

CROSS REFERENCE TO RELATED APPLICATION

This application claims priority to, and the benefit of, Finnish application No. 20225785 filed on 9 Sep. 2022, which is incorporated herein by reference in its entirety.

FIELD

Various example embodiments relate to determining number of repetitions of transmission of a message, for example, of a random access request.

BACKGROUND

When a user equipment establishes a connection with a network, a random access procedure may be performed between a user equipment, UE, and the network. Before the random access procedure, the UE may perform beam selection for transmission of a random access request.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided an apparatus comprising: at least one processor; and at least one memory storing instructions that, when executed by the at least one processor, cause the apparatus at least to perform: receiving, from a network node, a configuration being indicative of at least: at least one first threshold value for distinguishing between numbers of repetition of transmission; and at least one offset value for the at least one first threshold; measuring power values of synchronization signal block beams; selecting a beam based on the measured power values; determining a number of repetitions of transmission of a first message based on at least a mapping between number of repetitions and power values of synchronization signal block beams, the at least one first threshold value, the at least one offset value, and at least one condition; and transmitting, to the network node, the first message using the determined number of repetitions on the selected beam.

According to a second aspect, there is provided an apparatus comprising: at least one processor; and at least one memory storing instructions that, when executed by the at least one processor, cause the apparatus at least to perform: transmitting, to a user equipment, a configuration being indicative of at least: at least one first threshold value for distinguishing between numbers of repetition of transmission; and at least one offset value for the at least one first threshold value; receiving, from the user equipment, a first message with a number of repetitions determined based on at least a mapping between number of repetitions and power values of synchronization signal block beams, the at least one first threshold value, the at least one offset value, and at least one set of conditions.

According to an aspect, there is provided an apparatus comprising: means for receiving, from a network node, a configuration being indicative of at least: at least one first threshold value for distinguishing between numbers of repetition of transmission; and at least one offset value for the at least one first threshold; means for measuring power values of synchronization signal block beams; means for selecting a beam based on the measured power values; means for determining a number of repetitions of transmission of a first message based on at least a mapping between number of repetitions and power values of synchronization signal block beams, the at least one first threshold value, the at least one offset value, and at least one condition; and means for transmitting, to the network node, the first message using the determined number of repetitions on the selected beam.

According to an embodiment, the determining the number of repetitions of transmission of the first message comprises; a) determining that a measured power value of the selected beam is greater than a sum of the at least one first threshold value and the at least one offset value; and deciding, based on the determining, to use a first number of repetitions associated with the measured power value of the selected beam; or b) determining that the measured power value of the selected beam is less than or equal to the at least one first threshold value; and deciding, based on the determining, to use a second number of repetitions, which is higher than the first number of repetitions; or c) determining that the measured power value of the selected beam is greater than the at least one first threshold value and less than or equal to the sum of the at least one first threshold value and the at least one offset value; determining that the at least one condition is fulfilled; and deciding, based on the determining steps, to use the second number of repetitions; or d) determining that the measured power value of the selected beam is greater than the at least one first threshold value and less than or equal to the sum of the at least one first threshold value and the at least one offset value; determining that the at least one condition is not fulfilled; and deciding, based on the determining steps, to use the first number of repetitions.

According to an embodiment, the selecting the beam based on the measured power values comprises selecting the beam with the highest power value, and wherein the selected beam is a synchronization signal block beam or a transmit beam of the apparatus.

According to an embodiment, the measured power value is reference signal received power.

According to an embodiment, the apparatus comprises means for receiving a configuration comprising at least one second threshold for a difference between a measured power value of the selected beam and a measured power value of another beam having lower power value than the selected beam.

According to an embodiment, the at least one condition is from a set of: previous transmission(s) of a first message to the network node have been unsuccessful; maximum transmit power for transmission of a first message has been reached; the at least one first threshold value is less than a predetermined value, which defines a limit for redetermination of the number of repetitions; previous transmission(s) of a radio resource control requests to the network node have been unsuccessful; difference between a measured power value of the selected beam and a measured power value of another beam having lower power value than the selected beam is greater than a configured second threshold or greater than a sum of a plurality of configured second thresholds.

According to an embodiment, the first message is a random access request message.

According to an embodiment, the selected beam is the beam with the highest measured power value, and the another beam is the beam with the second highest measured power value.

According to an embodiment, the apparatus comprises means for detecting that transmission of the first message or a radio resource control request is unsuccessful; means for increasing the at least one offset value to obtain an updated offset value; and means for re-performing the determination of the number of repetitions using the updated offset value to obtain a re-determined number of repetitions; means for transmitting the first message using the re-determined number of repetitions.

According to an embodiment, the apparatus comprises means for increasing the at least one offset value based on a number of detected unsuccessful transmissions of the first message or of the radio resource control request.

According to an embodiment, the apparatus comprises means for increasing the at least one offset value until receiving a response to the first message or to the radio resource control request from the network node.

According to an embodiment, the apparatus comprises means for receiving a configuration comprising a third threshold value defining a maximum number of unsuccessful transmissions of the first message or of the radio resource control request; and means for increasing the at least one offset value until number of unsuccessful transmissions of the first message or of the radio resource control request reaches the third threshold value.

According to an embodiment, the apparatus comprises means for detecting that transmission of the first message or the radio resource control request has been unsuccessful a number of times which is greater than the third threshold; and means for repeating transmission of the first message or the radio resource control request using a latest determined number of repetitions until receiving a response to the first message or to the radio resource control request.

According to an aspect, there is provided an apparatus comprising means for transmitting, to a user equipment, a configuration being indicative of at least: at least one first threshold value for distinguishing between numbers of repetition of transmission; and at least one offset value for the at least one first threshold value; means for receiving, from the user equipment, a first message with a number of repetitions determined based on at least a mapping between number of repetitions and power values of synchronization signal block beams, the at least one first threshold value, the at least one offset value, and at least one set of conditions.

According to an aspect, there is provided a method, comprising: receiving, by a user equipment from a network node, a configuration being indicative of at least: at least one first threshold value for distinguishing between numbers of repetition of transmission; and at least one offset value for the at least one first threshold; measuring power values of synchronization signal block beams; selecting a beam based on the measured power values; determining a number of repetitions of transmission of a first message based on at least a mapping between number of repetitions and power values of synchronization signal block beams, the at least one first threshold value, the at least one offset value, and at least one condition; and transmitting, to the network node, the first message using the determined number of repetitions on the selected beam.

According to an embodiment, the method comprises receiving a configuration comprising at least one second threshold for a difference between a measured power value of the selected beam and a measured power value of another beam having lower power value than the selected beam.

According to an embodiment, the method comprises detecting that transmission of the first message or a radio resource control request is unsuccessful; increasing the at least one offset value to obtain an updated offset value; and re-performing the determination of the number of repetitions using the updated offset value to obtain a re-determined number of repetitions; transmitting the first message using the re-determined number of repetitions.

According to an embodiment, the method comprises increasing the at least one offset value based on a number of detected unsuccessful transmissions of the first message or of the radio resource control request.

According to an embodiment, the method comprises increasing the at least one offset value until receiving a response to the first message or to the radio resource control request from the network node.

According to an embodiment, the method comprises receiving a configuration comprising a third threshold value defining a maximum number of unsuccessful transmissions of the first message or of the radio resource control request; and increasing the at least one offset value until number of unsuccessful transmissions of the first message or of the radio resource control request reaches the third threshold value.

According to an embodiment, the method comprises detecting that transmission of the first message or the radio resource control request has been unsuccessful a number of times which is greater than the third threshold; and repeating transmission of the first message or the radio resource control request using a latest determined number of repetitions until receiving a response to the first message or to the radio resource control request.

According to an aspect, there is provided a (non-transitory) computer readable medium comprising instructions that, when executed by an apparatus, cause the apparatus to perform at least the method of the previous aspect and the embodiments thereof.

According to an aspect, there is provided a method, comprising: transmitting, by a network node to a user equipment, a configuration being indicative of at least: at least one first threshold value for distinguishing between numbers of repetition of transmission; and at least one offset value for the at least one first threshold value; receiving, from the user equipment, a first message with a number of repetitions determined based on at least a mapping between number of repetitions and power values of synchronization signal block beams, the at least one first threshold value, the at least one offset value, and at least one set of conditions.

According to an aspect, there is provided a (non-transitory) computer readable medium comprising instructions that, when executed by an apparatus, cause the apparatus to perform at least the method of the previous aspect.

According to an embodiment, the means comprises at least one processor; and at least one memory storing instructions that, when executed by the at least one processor, cause the performance of the apparatus.

BRIEF DESCRIPTION OF THE DRAWINGS

Some example embodiments will now be described with reference to the accompanying drawings.

FIG. 10 shows, by way of example, a flowchart of a method; and

FIG. 11 shows, by way of example, a flowchart of a method.

DETAILED DESCRIPTION

Figure 1:
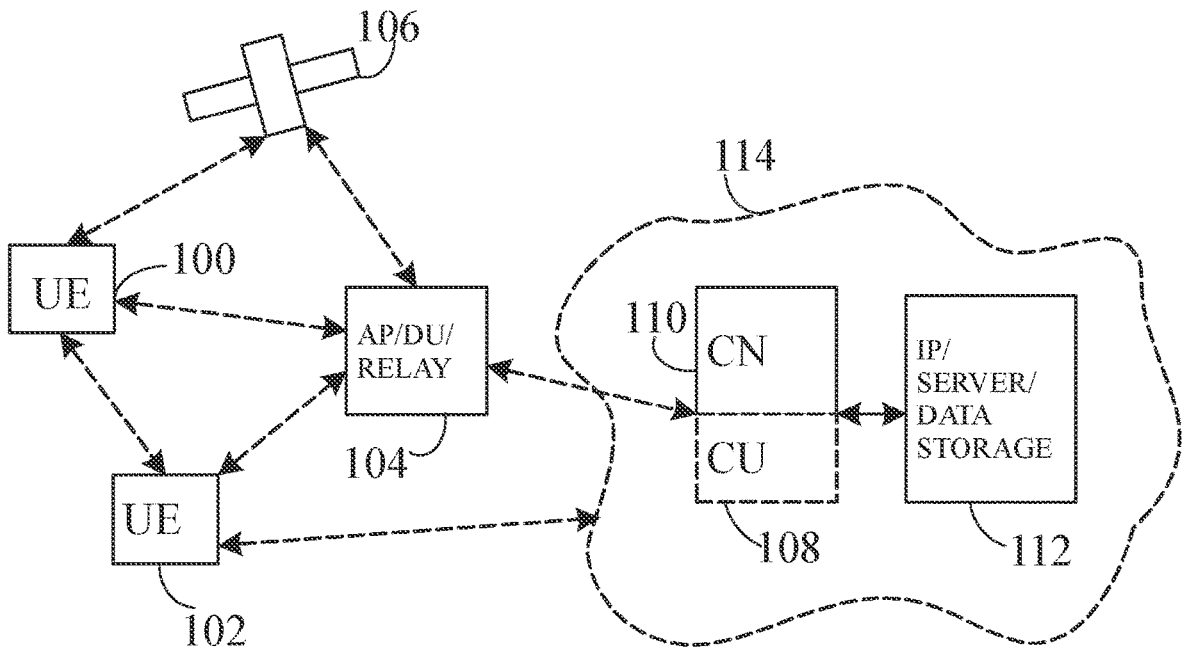
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices or user equipments (UEs) 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz-cmWave, below 7 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

When a user equipment (UE) is to be connected to the network, the UE performs a random access procedure to synchronize with the network. Random access procedure may be contention based random access (CBRA) or contention free random access (CFRA).

For example, in 5G new radio (NR), two CBRA procedures are supported: a 4-step random access channel (RACH) procedure and a 2-step RACH procedure.

Before the RACH procedure, a network node performs DL beam sweeping so that the UE may select the index of a preferred synchronization signal block (SSB) beam and decode the associated physical broadcast channel (PBCH) for master information block (MIB) and system information block (SIB), etc. The selected index is also used by the UE to identify a suitable RACH occasion (RO) for a preamble transmission, according to the SSB-to-RO mapping conveyed by SIB type 1 (SIB1). The network node may use the same SSB index for transmission of a random access response (RAR).

In 4-step RACH procedure, the UE sends a preamble to a network node, e.g. gNB, via physical random access channel (PRACH) using a resource named as RACH occasion (RO). This first message may be referred to as a random access request or Msg1, for example.

The network node responds with a random access response (RAR) message, that is, Msg2 or a second message. The RAR message includes the detected preamble identifier (ID), time-advance command, a temporary cell radio network temporary identifier (TC-RNTI), and UL grant for the transmission of the following message, Msg3, on a physical uplink shared channel (PUSCH).

The UE responds to Msg2 with a radio resource control (RRC) request, that is, Msg3 or a third message. The Msg3 is transmitted on the scheduled PUSCH with an ID for contention resolution.

The network node transmits RRC setup message, which may be referred to as a Msg4 or the contention resolution message or a fourth message. The RRC setup message includes a contention resolution ID.

If the Msg4 includes the contention resolution ID of the UE, the UE sends, after receiving the Msg4, an acknowledgement ACK on a physical uplink control channel (PUCCH). This completes the 4-step RACH procedure.

In the 2-step RACH procedure, the Msg1 and Msg3 are combined in a MsgA, and the Msg2 and Msg4 are combined in a MsgB. The 2-step RACH is a one round trip transfer of control signalling between the UE and the network node.

In LTE, repetitive transmission of Msg1 may be used to improve the coverage of the PRACH. Repetitions of transmission allow a receiver, the network node in this case, to collect more energy from the transmitting entity and thereby increase the receiving signal-to-noise ratio (SNR), detection performance and decoding performance.

Number of repetitions may be determined based on measured power levels. For example, UE may be configured to measure reference signal received power (RSRP) of the SS/PBCH block. Power levels represent different coverage enhancement (CE) levels which have been associated to a different number of repetitions. For example, UE may measure SS-RSRP of −82 dBm (decibel-milliwatts), which belongs to the first CE level based on an association table or a look-up table of power levels and numbers of repetitions. The first CE level corresponds to 2 repetitions, and hence, the UE would be transmitting Msg1 with 2 repetitions to the network.

In 5G NR, the network may broadcast multiple SS/PBCH blocks with different indices with different spatial filter settings. In other words, the network may broadcast several SSB beams. In addition, in FR2, UE is equipped with multiple antenna panels and is able to create itself multiple UE beams per panel to receive with more or less power the several SSB beams broadcasted by the network node. The UE may also transmit on the beams created by the UE itself.

Therefore, in 5G NR, a UE may receive a similar RSRP from the same or different SSB beams in FR1 and FR2, and/or on different UE panels or UE beams in FR2, and would in general select the SSB beam and/or UE panel or UE beam (in FR2) with the highest RSRP for optimal link budget.

Figure 2:
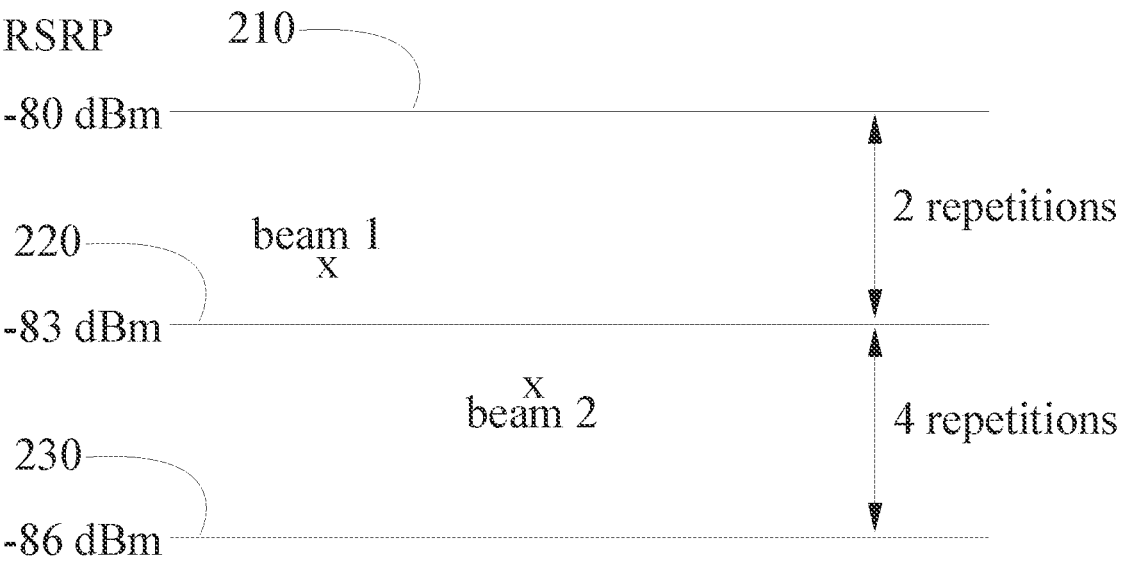
FIG. 2 shows, by way of example, association between power levels and numbers of repetition of a random access request.

FIG. 2 shows, by way of example, association between power levels and numbers of repetition of a random access request. Threshold power levels 210, 220, 230 have been defined for different CE levels. In this example scenario, UE has measured an SS-RSRP of −83.5 dBm for SSB beam 2 and an SS-RSRP of −82.5 dBm for SSB beam 1. Based on the measurements, the UE is configured to pick SSB beam 1 for Msg1 transmission, since it provides a 1 dB gain on the link budget. The UE is configured to transmit Msg1 on the beam 1 with 2 repetitions.

However, such a choice of SSB beam and/or UE transmit beam may be sub-optimal since the two SSB beams and/or the two UE transmit beams are associated with different number of Msg1 repetitions. Doubling in the number of repetitions provides gain, for example, up to 3 dB gain. Thus, a 2 dB gain may be achieved using the SSB beam 2 with 4 repetitions compared to using the SSB beam 1 with 2 repetitions, taking into account the 1 dB loss in SS-RSRP but 3 dB gain in number of repetitions. Therefore, selecting the SSB beam with the highest RSRP with only small (e.g. 1 dBm) RSRP difference between the beams, may be a sub-optimal choice.

Even more gain may be achieved if the UE is allowed to exceptionally use a number of repetitions that is different from the one originally configured to be associated with an SSB beam. For example, in the example of FIG. 2, using the SSB beam 1 with four repetitions would be the most optimal selection in terms of RSRP.

Methods are provided to allow UE to exceptionally and under certain conditions to adjust a number of repetitions of transmission of the random access request.

Figure 3:
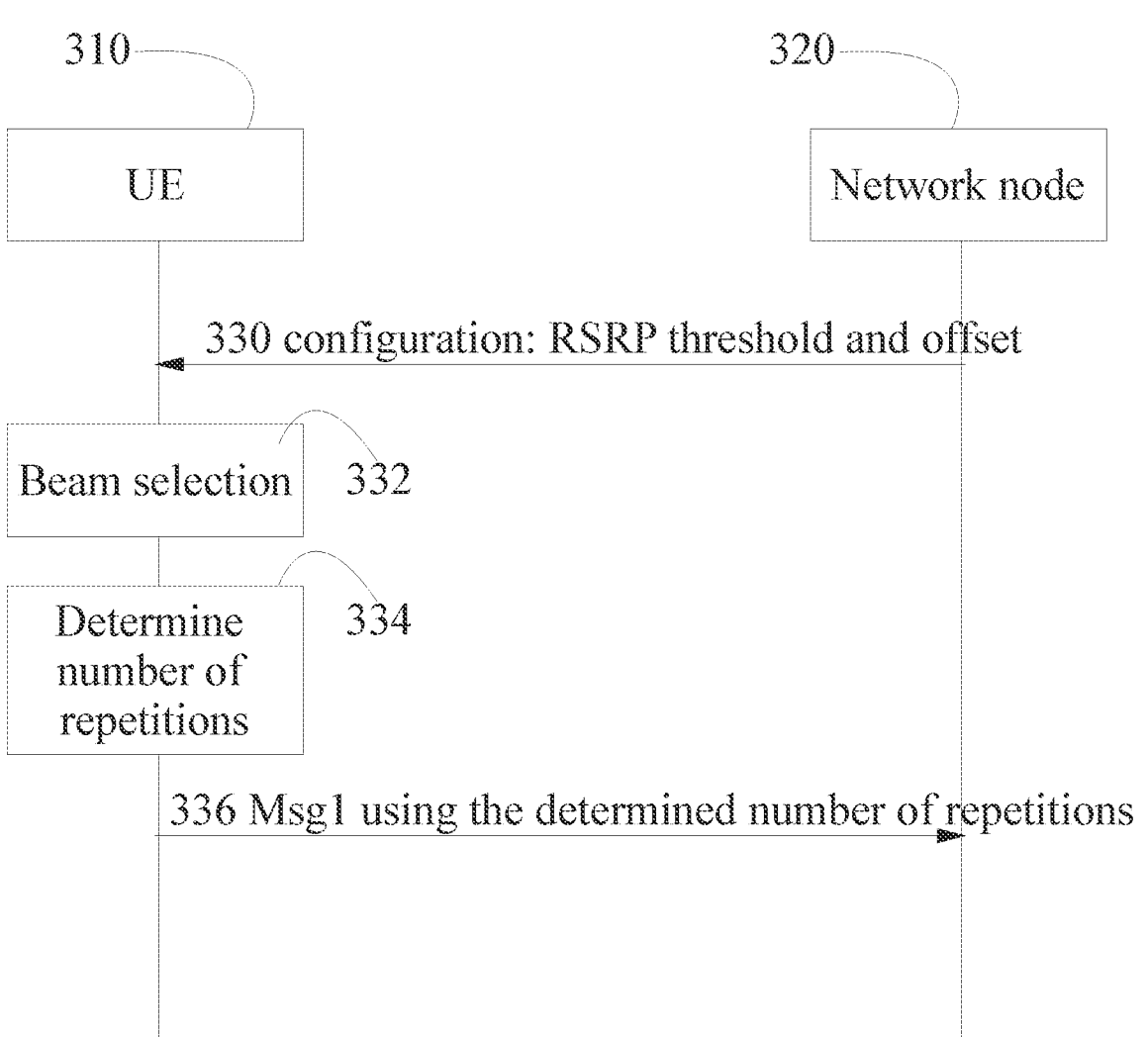
FIG. 3 shows, by way of example, signalling between entities.

FIG. 3 shows, by way of example, signalling between entities. The network node 320, for example, gNB, transmits to the UE 310 different SSBs with different indices. With reference to FIG. 1, the network node 320 may correspond to AP/DU/relay 104, and the UE 310 may correspond to UE 100. The network node 320 transmits 330 a configuration, for example, via SIB 1/RRC configuration, wherein the configuration is indicative of at least: at least one first threshold value T and at least one offset value K. The threshold value T is for distinguishing between two or more repetition factors. In the example of FIG. 2, values −80 dBm, −83 dBm, and −86 dBm are examples of threshold values T. The first threshold value T, or power threshold value T, defines a power level, e.g. an RSRP threshold, for distinguishing whether a lower number of repetitions (e.g. 2 repetitions) or a higher number of repetitions (e.g. 4 repetitions) is to be used for an SSB beam based on its RSRP.

The offset value K defines a range for the power such that within the range from T dBm to (T+K) dBM, the UE is allowed to, based on certain conditions, use a higher number of repetitions instead of a lower number of repetitions as originally configured. The power range from T dBM to (T+K) dBM may be referred to as a grey zone.

The UE 310 performs the beam selection 332 by measuring the power values of SSB beams and selecting a beam based on the measured power values. For example, the UE may measure the RSRP of the SSB beams and determine the best or optimal SSB beam in terms of RSRP. For example, the SSB beam with the highest RSRP may be selected.

In other words, the UE may measure power values of a plurality of reference signals. For example, the UE may measure power values of several SSB indexes, across different UE beams. The UE may select one reference signal based on the measured power values. For example, the UE may select the reference signal with the highest power value measured across different UE receiving beams.

The UE 310 determines 334 a number of repetitions of a first message to be transmitted with the selected beam, e.g. the best SSB beam. The first message may be, for example, a random access request or Msg1 or MsgA, The determination is performed based on a mapping or association between number of repetitions and power values of SSB beams.

Figure 4:
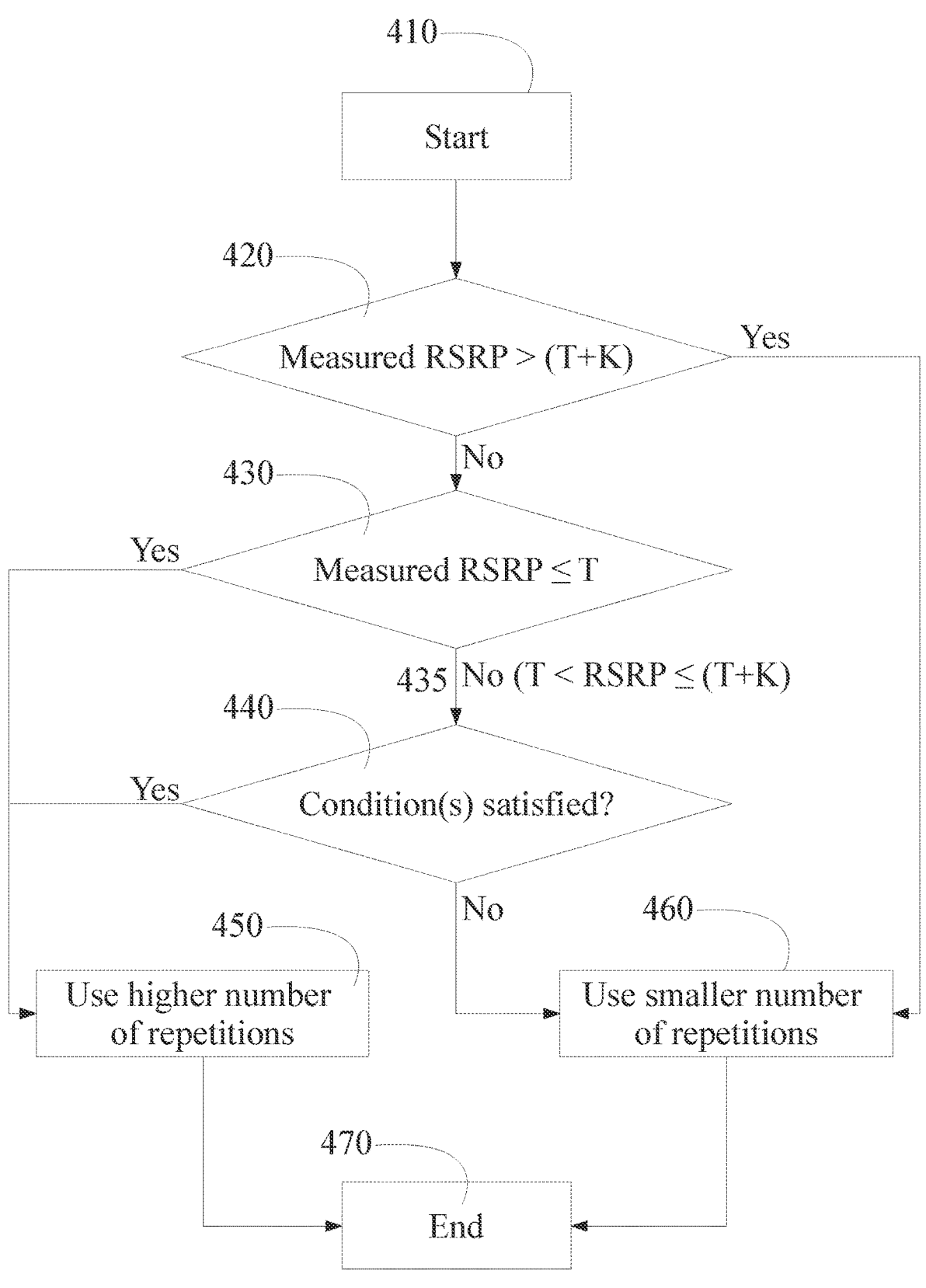
FIG. 4 shows, by way of example, an algorithm for determining number of repetitions of a message.

FIG. 4 shows, by way of example, an algorithm from start 410 to the end 470 for determining number of repetitions of a message, e.g. of the first message. The determination comprises:

a) 420: if a measured power value of the selected beam is above, or greater than, a sum of the at least one first threshold value and the at least one offset value, deciding 460 to use a first number of repetitions associated with the measured power value of the selected beam (smaller number of repetitions);

b) 430: if the measured power value of the selected beam is less than, or equal to the at least one first threshold value, deciding 450 to use a second number of repetitions (higher number of repetitions), which is higher than the first number of repetitions;

c) 435: if the measured power value of the selected beam is above, or greater than, the at least one first threshold value and less than or equal to the sum of the at least one first threshold value and the at least one offset value, determining 440 if at least one condition is fulfilled;

if the at least one condition is fulfilled, deciding 450 to use the second number of repetitions;

if the at least one condition is not fulfilled, deciding 460 to use the first number of repetitions.

An algorithm may be written, for example, as follows:
If the measured RSRP>(T+K) dBm
    use the smaller number of repetitions (e.g., 2 repetitions)
else if T<the measured RSRP≤(T+K) dBm
    If a set of conditions is satisfied,
      use the higher number of repetitions (e.g., 4 repetitions)
    else
      use the smaller number of repetitions (e.g., 2 repetitions)
    end if
else (i.e., the measured RSRP≤T)
    use the higher number of repetitions (e.g., 4 repetitions).

When the number of repetitions has been determined, the UE 310 transmits 336, to the network node 320, the first message using the determined number of repetitions on the selected beam. For example, the UE may transmit on resources associated with the selected reference signal of the plurality of reference signals.

With the method as disclosed herein, the UE may determine the most optimal number of repetitions for transmission of the first message. UE is allowed to use a number of repetitions of the first message, which is different than originally determined based on the measured power of the selected beam, e.g. the best beam.

In 440, the UE determines if at least one condition is fulfilled. The set of conditions may be predefined in standard specifications or configured by the network node, for example. The at least one condition is from a set of:

previous transmission(s) of a first message to the network node have been unsuccessful; The UE may detect this by not receiving a response, e.g. Msg2, to the first message, e.g. Msg1.

maximum transmit power for transmission of a first message has been reached; Thus, no power ramping is not possible.

the at least one first threshold value is less than a predetermined value, which defines a limit for redetermination of the number of repetitions; For example, it may be configured that the possible redetermination of the number of repetitions will not be performed by the UE if the RSRP is high enough. For example, the redetermination is applied for a smaller value of T, e.g. −86 dBm, which is, for example, used to split between 4-repetitions-zone and 8-repetitions-zone, but the redetermination is not applied for a higher value of T, e.g. −83 dBm, which is, for example, used to split between 2-repetitions-zone and 4-repetitions-zone.

previous transmission(s) of a radio resource control (RRC) requests to the network node have been unsuccessful; For example, UE has received response, e.g. Msg2, to the first message, Msg1, but has not received response, e.g. Msg4, to the RRC request, e.g. Msg3. If the UE has not received the Msg4, the random access procedure may start again from transmission of the Msg1.

difference between a measured power value of the selected beam and a measured power value of another beam having lower power value than the selected beam is greater than a configured second threshold (L, explained below) or greater than a sum of a plurality of configured second thresholds. For example, the gap between the best SSB beam and the second best SSB beam is greater than a threshold, which is configured by the network node. The gap in the power values may be referred to as delta_RSRP.

Figure 5:
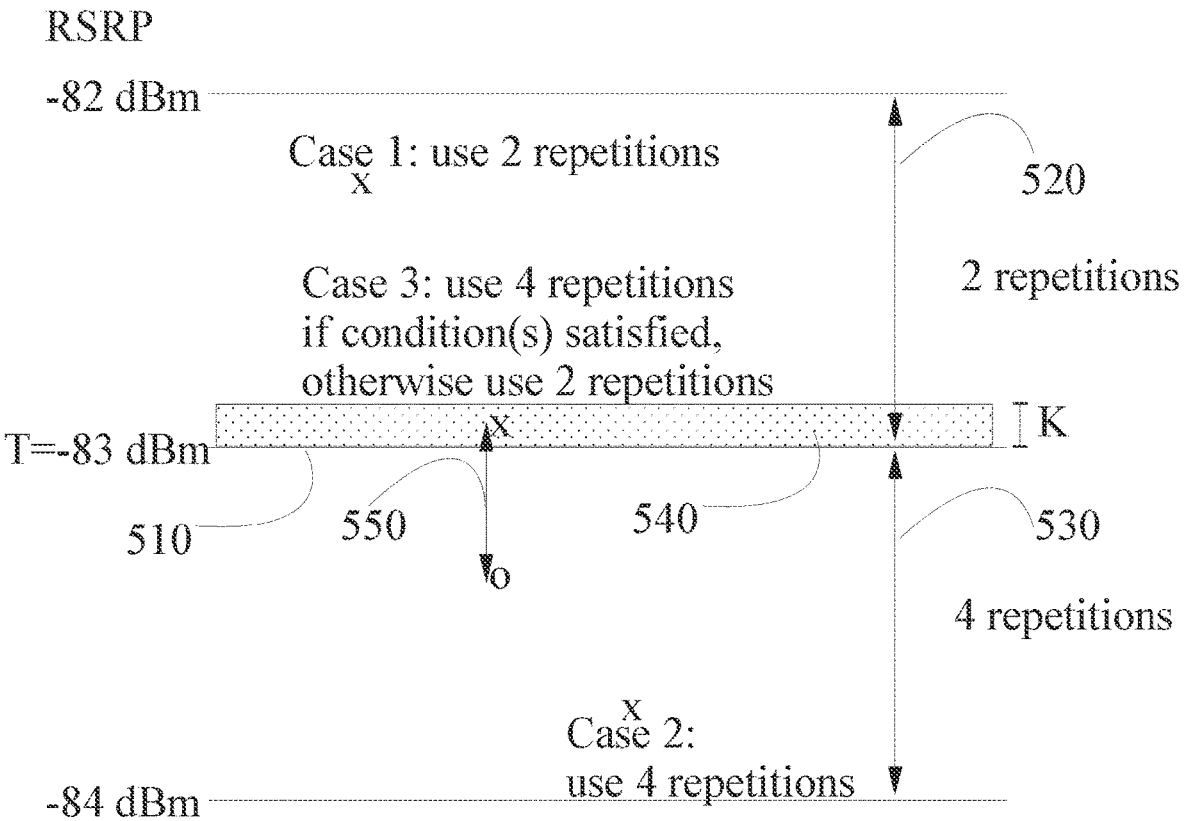
FIG. 5 shows, by way of example, association between power levels and numbers of repetition of a random access request.

FIG. 5 shows, by way of example, association between power levels and numbers of repetition of a random access request. The UE has been configured with a threshold value, e.g. RSRP threshold value T=−83 dBM 510 splitting the 2-repetitions-zone 520 and the 4-repetitions-zone 530. The UE has been configured with offset value, e.g. RSRP offset value K. The network may configure a plurality of threshold values splitting many repetitions zones. The network may configure the same offset for the plurality of threshold values, or the offset may be different for different threshold values.

In case 1, the measured power value, e.g. RSRP, of the SSB beam is greater than (T+K). Thus, the first message will be sent with a first number of repetitions, which corresponds to the repetition zone 520 associated with the measured power value. In this example, the first message will be sent with 2 repetitions.

In case 2, the measured power value, e.g. RSRP, of the SSB beam is less than T or equal to T. Thus, the first message will be sent with a second number of repetitions, which corresponds to the repetition zone 530 associated with the measured power value. The second number of repetitions is higher than the first number of repetitions. In this example, the first message will be sent with 4 repetitions.

In case 3, the measured power value, e.g. RSRP, of the SSB beam is greater than T and less than or equal to (T+K). In other words, the measured power value is in the grey zone 540. Then, the UE determines if at least one condition, as listed above, is fulfilled.

If at least one condition is fulfilled, the first message will be sent with the second number of repetitions, that is, with higher number of repetitions than originally configured. In this case, the first message would be sent with 4 repetitions instead of 2 repetitions, which would correspond to the repetition zone associated with the measured power value.

If at least one condition is not fulfilled, the first message would be sent with the first number of repetitions.

Figure 6:
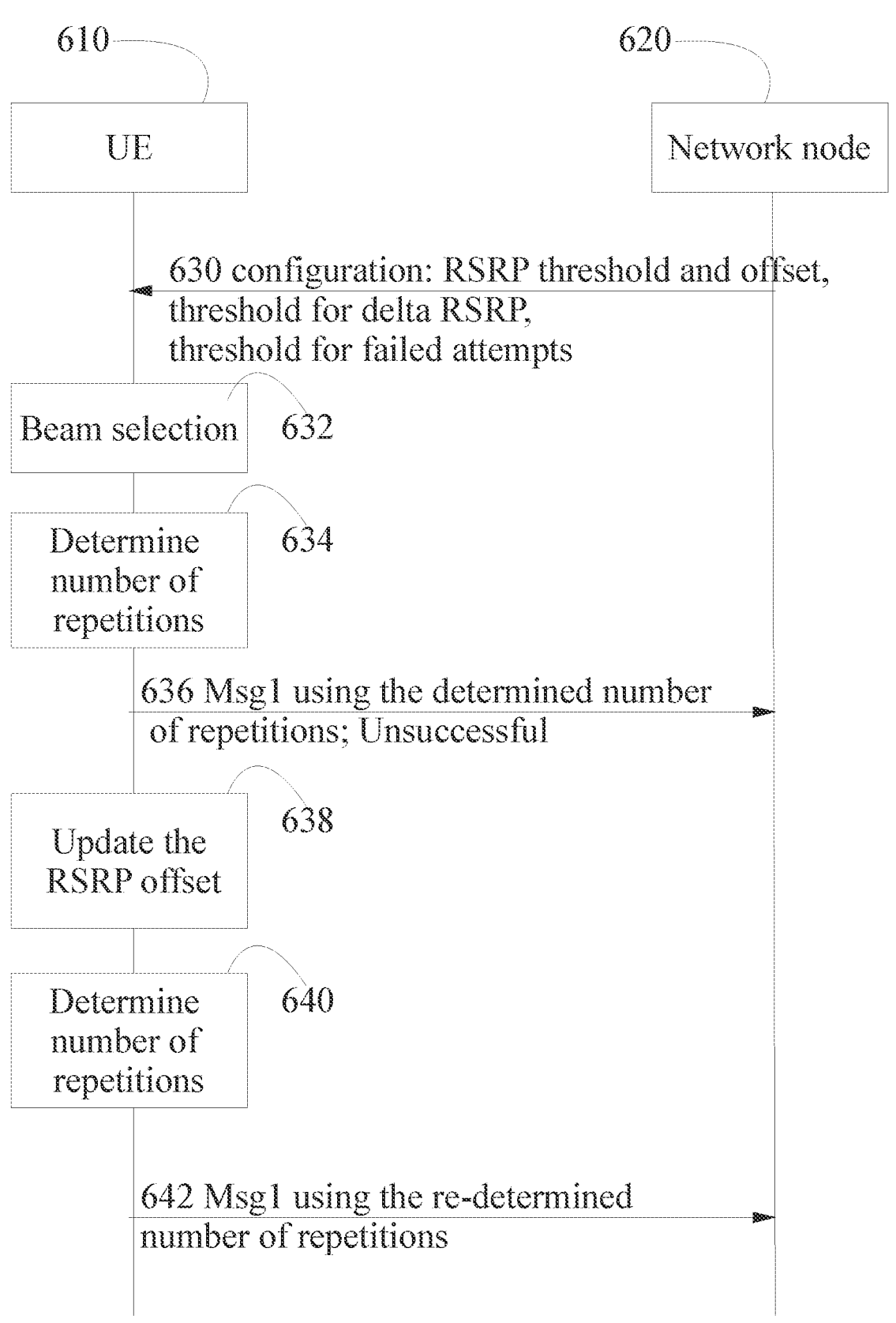
FIG. 6 shows, by way of example, signalling between entities.

FIG. 6 shows, by way of example, signalling between entities. The network node 620, for example, gNB, transmits to the UE 610 different SSBs with different indices. The network node 620 transmits 630 a configuration, for example, via SIB 1/RRC configuration, wherein the configuration is indicative of at least: at least one first threshold value T and at least one offset value K. The threshold value T is for distinguishing between two or more repetition factors. The offset value K defines a range for the power such that within the range from T dBm to (T+K) dBM, the UE is allowed to, based on certain conditions, use a higher number of repetitions instead of a lower number of repetitions as originally configured. The power range from T dBM to (T+K) dBM may be referred to as a grey zone.

In addition, the configuration may be indicative of at least one second threshold. The second threshold L, or power difference threshold L, is for delta_RSRP, which may be used when evaluating the set of conditions listed above. The delta_RSRP is a difference or gap between measured power values of the selected beam and another beam having lower power value than the selected beam. The selected beam may be the best beam in terms of RSRP and the another beam may be the second best beam in terms of RSRP. Threshold L defines a threshold for the delta_RSRP. For example, in FIG. 5, delta_RSRP 550 is the difference between the best beam (x) and the second best beam (o) of case 3.

In addition, the configuration may be indicative of a third threshold. The third threshold N defines a maximum number of failed attempts to transmit the first message or the RRC request, and it may be used to limit the increase of the offset value K after failed attempts of transmitting the first message or the RRC request.

Beam selection 632 and the determination of number of repetitions 634 correspond to the beam selection 332 and the determination of number of repetitions 334 described in the context of FIG. 3.

In the example of FIG. 6, the transmission 636 of the first message is unsuccessful. The UE 610 may detect that the transmission of the first message is unsuccessful based on, for example, not receiving a response (e.g. Msg2) to the first message (e.g. Msg1) before the random access response (RAR) window expires.

Based on detecting that the transmission of the first message is unsuccessful, the UE may update 638 or increase the offset value K to obtain an updated offset value. Increasing of the offset value may be based on a number of failed attempts to transmit the first message.

For example, the UE may update K such that $K=\alpha-1+K$ for the $\alpha^{th}$ attempt of sending Msg1, if the $(\alpha-1)^{th}$ attempt has been failed, where $\alpha=2, 3, \ldots N$, wherein N is the third threshold.

As another example, the UE may update K such that $K=\alpha*K$, for the $\alpha^{th}$ attempt of sending Msg1, if the $(\alpha-1)^{th}$ attempt has been failed, where $\alpha=2, 3, \ldots N$, wherein N is the third threshold.

As described above, threshold N may be configured and limited by the network node, e.g. gNB. This limits the first message repetition, or PRACH message repetition, overhead by allowing UEs to increase repetitions when strictly needed, e.g. only when strictly needed, considering uncertainties in the channel. As an example, if a UE has measured a good RSRP clearly above T, such UE should first try to re-transmit Msg1 with the same number of repetitions as the first transmission, since most likely its first transmission failed because of an unexpected and temporary event. If the re-transmission fails as well, it may be an indicator that noise/interference conditions have changed at the network node, and the UE could be then allowed to increase the number of Msg1 repetition in the following attempt. A network node may be expected to set T relative to its estimated longer term noise/interference conditions.

The UE re-performs the determination 640 of the number of repetitions using the updated offset value to obtain a re-determined number of repetitions.

The UE transmits 642 the first message using the re-determined number of repetitions.

Updating 638 or increasing of the offset value and re-determination 640 of the number of repetitions may be continued until the number of failed attempts to transmit the first message reaches the third threshold value, or until the UE receives a response to the first message from the network node.

If the transmission of the first message fails more than given by the third threshold N, the UE may repeat the transmission of the first message using the latest determined number of repetitions. That is, the UE repeats the transmission of the first message without further updating the offset value K and re-determination of the number of repetitions.

Referring back to the configurations 330, 630 of FIG. 3 and FIG. 6, the network node may disable the repetition of the first message by not including the threshold parameter T to the configuration. The network may disable the determination of number of repetitions as disclosed herein by not including the offset K to the configuration. The network may disable the use of certain conditions in the determination of number of repetitions by not including threshold L and/or threshold N to the configuration.

Figure 7:
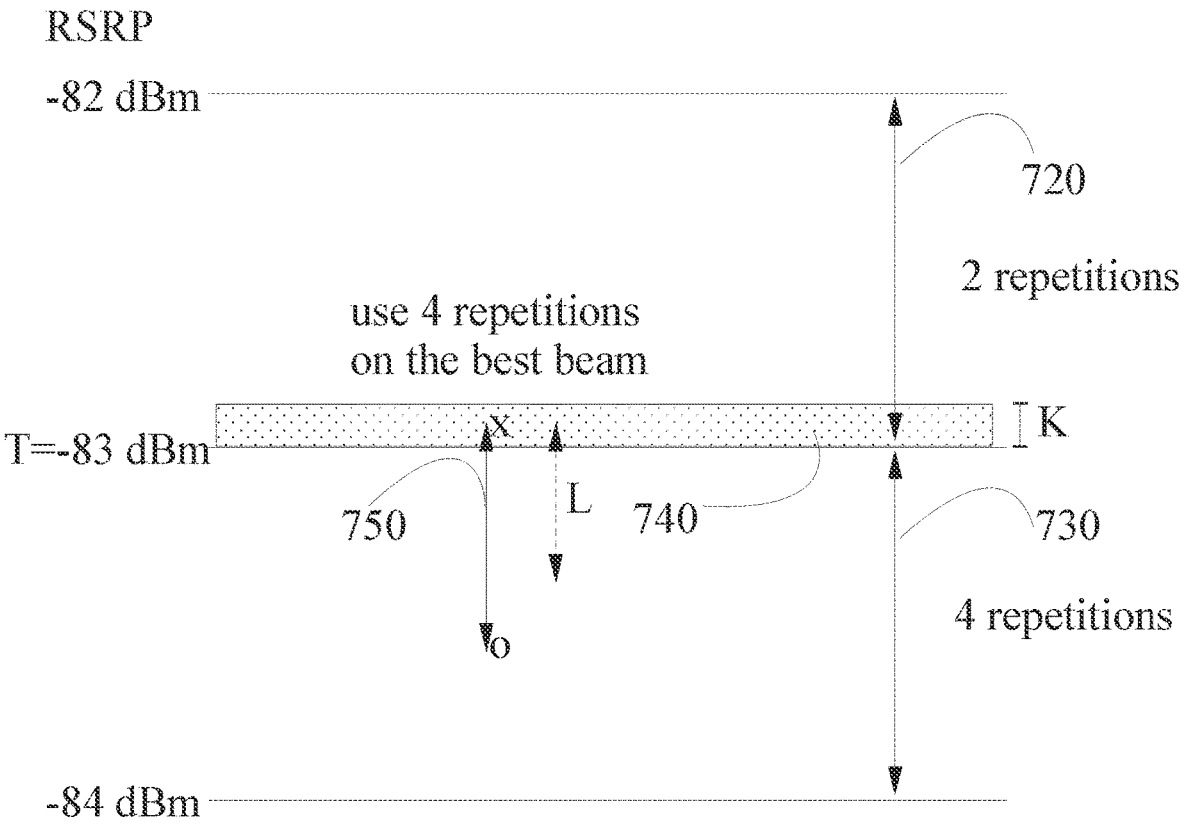
FIG. 7 shows, by way of example, association between power levels and numbers of repetition of a random access request.

FIG. 7 shows, by way of example, association between power levels and numbers of repetition of a random access request. UE has measured the power values of SSB beams and power value of the best beam x would originally be associated with the 2-repetitions-zone 720. Thus, originally configured number of repetitions as determined based on a mapping between number of repetitions and power value of SSB beams would be 2. However, the power value of the best beam x is in the grey zone 740, that is, greater than T and less than T+K. This allows UE to determine the number of repetitions by the method as disclosed herein. Thus, the UE may determine if at least one condition is fulfilled.

In the example of FIG. 7, the best beam and the second best beam are associated with consecutive zones 720, 730 of repetitions factor. Since the difference 750, or delta_RSRP, between the best beam x and the second best beam o is greater than the threshold L, at least one condition is fulfilled and the UE determines the number of repetitions to be higher than determined based on the repetitions zone corresponding to the measured power value, RSRP. Thus, the UE will use the number of repetitions of the following zone, that is, the 4-repetitions-zone 730. The UE will transmit the random access request using 4 repetitions on the beam x.

Figure 8:
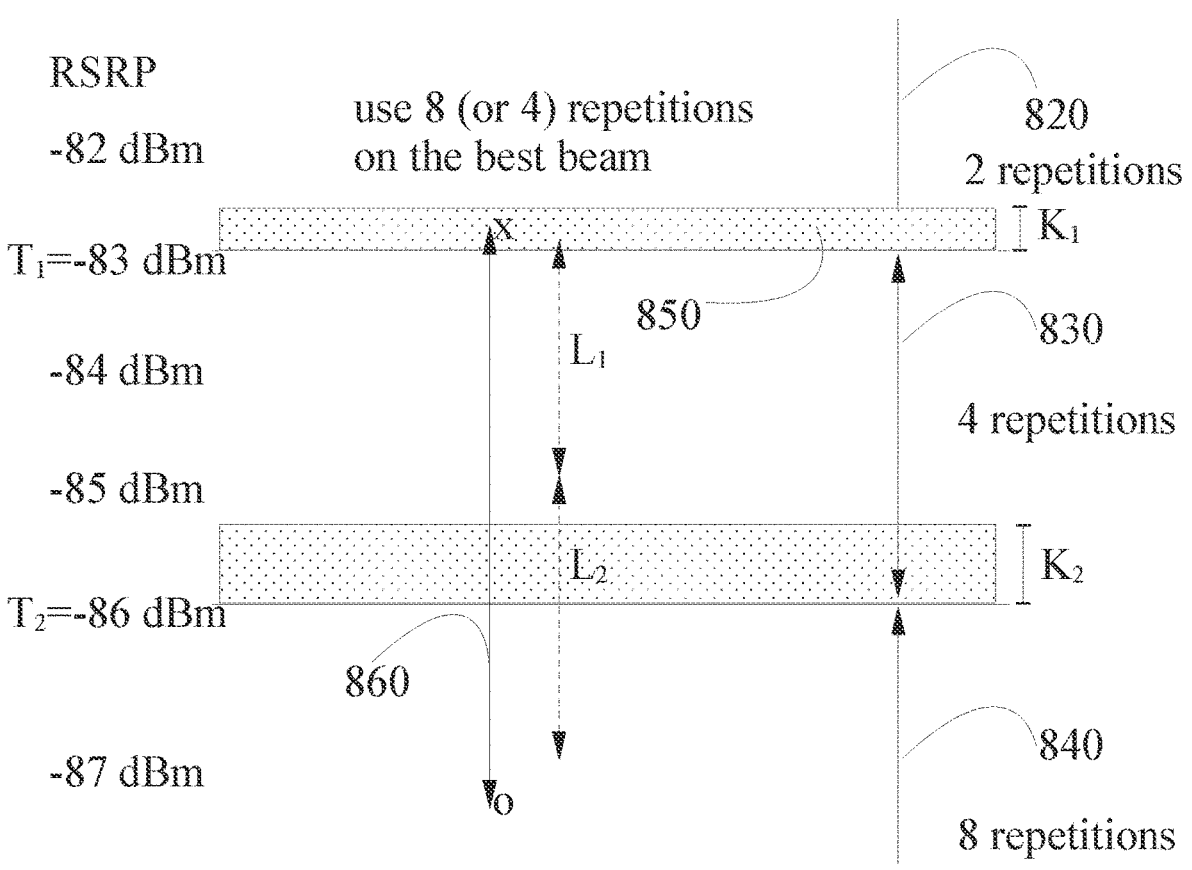
FIG. 8 shows, by way of example, association between power levels and numbers of repetition of a random access request.

FIG. 8 shows, by way of example, association between power levels and numbers of repetition of a random access request. In this example, the best beam x and the second best beam o are associated with non-consecutive zones of repetitions factor. The best beam x is associated with 2-repetitions-zone 820, and the second best beam o is associated with 8-repetitions zone 840.

In this example, UE has been configured with a plurality of first thresholds T: T1 and T2; a plurality of offsets K: K1 and K2; and a plurality of second thresholds L: L1 and L2. As shown, offset K1 for threshold T1 may be different than offset K2 for threshold T2. Thresholds L1 and L2 may be different or they may be the same. Offsets and the second thresholds may be associated with the first thresholds distinguishing the zones 820, 830, 840. Different sets of conditions may be specified for different zones 820, 830, 840.

UE has measured the power values of SSB beams and power value of the best beam x would originally be associated with the 2-repetitions-zone 820. Thus, originally configured number of repetitions as determined based on a mapping between number of repetitions and power value of SSB beams would be 2. However, the power value of the best beam x is in the grey zone 850, that is, greater than T1 and less than T1+K1. This allows UE to determine the number of repetitions by the method as disclosed herein. Thus, the UE determines if at least one condition is fulfilled.

The difference 850, or delta_RSRP, between the best beam x and the second best beam o is greater than the sum of the second thresholds L1 and L2. (delta_RSRP>L1+L2) Thus, at least one condition is fulfilled. The UE determines the number of repetitions to be higher than determined based on the repetitions zone corresponding to the measured power value, RSRP. The UE will use the number of repetitions of the zone associated with the second best beam, that is, the 8-repetitions-zone 840. If, for example, the zone associated with the second best beam would be the 4-repetitions-zone 830, and the above condition is fulfilled, the UE will use the number of repetitions of the zone 830, that is, the 4-repetitions-zone 830. In the example of FIG. 8, the UE will transmit the random access request using 8 repetitions on the beam x.

An algorithm may be written, for example, as follows:
If $$delta_{RSRP} \leq \sum\nolimits_{j=1}^{M-1} L_j,$$

where M is the number of repetition factor zones that the best beam and the second best beams span across (e.g. M=3 as in FIG. 8):
  select the second-best SSB beam
  use the number of repetitions associated with the second best SSB beam for the second-best beam
else if RSRP of the best SSB beam is in the gray zone (850 in FIG. 8) and $$delta_{RSRP} > \sum\nolimits_{j=1}^{M-1} L_j$$

select the best SSB beam
  use the number of repetitions associated with the second best SSB beam for the best SSB beam
else
  select the best SSB beam
  use the number of repetitions associated with the best SSB beam for the best SSB beam
end if.

The grey zone defined by the offset K enables optimized behaviour when the delta_RSRP between the SSB beams is larger than a threshold L. A plurality of thresholds L enables handling a situations wherein the measured power values of the best and second best beams are not in consecutive zones of repetitions factors.

Figure 9:
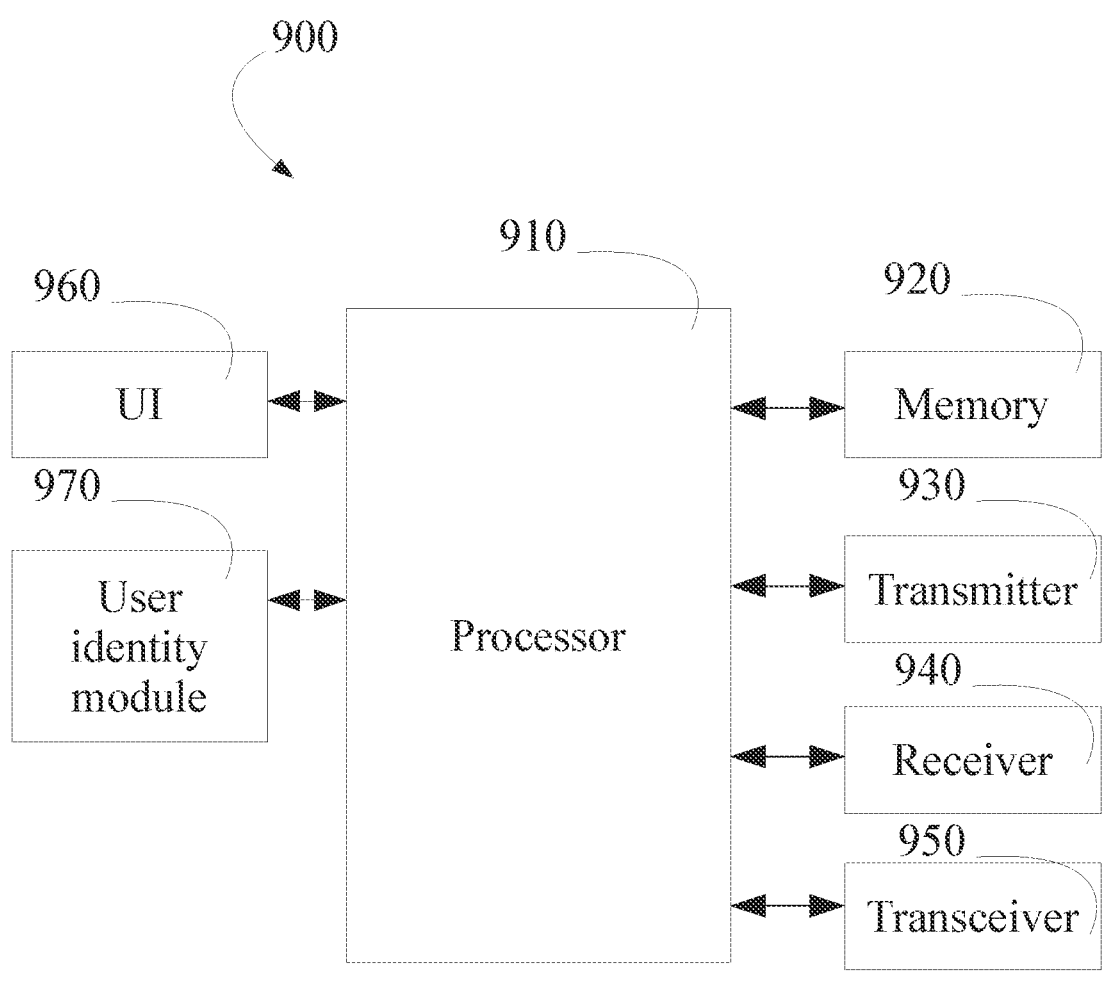
FIG. 9 shows, by way of example, a block diagram of an apparatus.

FIG. 9 shows, by way of example, a block diagram of an apparatus capable of performing the method(s) as disclosed herein. Illustrated is device 900, which may comprise, for example, a mobile communication device such as mobile 100 of FIG. 1 or UE 310 of FIG. 3, or a network node 320 of FIG. 3. Comprised in device 900 is processor 910, which may comprise, for example, a single- or multi-core processor wherein a single-core processor comprises one processing core and a multi-core processor comprises more than one processing core. Processor 910 may comprise, in general, a control device. Processor 910 may comprise more than one processor. Processor 910 may be a control device. A processing core may comprise, for example, a Cortex-A8 processing core manufactured by ARM Holdings or a Steamroller processing core designed by Advanced Micro Devices Corporation. Processor 910 may comprise at least one Qualcomm Snapdragon and/or Intel Atom processor. Processor 910 may comprise at least one application-specific integrated circuit, ASIC. Processor 910 may comprise at least one field-programmable gate array, FPGA. Processor 910 may be means for performing method steps in device 900. Processor 910 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a user equipment or a network node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 900 may comprise memory 920. Memory 920 may comprise random-access memory and/or permanent memory. Memory 920 may comprise at least one RAM chip. Memory 920 may comprise solid-state, magnetic, optical and/or holographic memory, for example. Memory 920 may be at least in part accessible to processor 910. Memory 920 may be at least in part comprised in processor 910. Memory 920 may be means for storing information. Memory 920 may comprise instructions, such as computer instructions or computer program code, that processor 910 is configured to execute. When instructions configured to cause processor 910 to perform certain actions are stored in memory 920, and device 900 overall is configured to run under the direction of processor 910 using instructions from memory 920, processor 910 and/or its at least one processing core may be considered to be configured to perform said certain actions. Memory 320 may be at least in part external to device 900 but accessible to device 900.

Device 900 may comprise a transmitter 930. Device 900 may comprise a receiver 940. Transmitter 930 and receiver 940 may be configured to transmit and receive, respectively, information in accordance with at least one cellular or non-cellular standard. Transmitter 930 may comprise more than one transmitter. Receiver 940 may comprise more than one receiver. Transmitter 930 and/or receiver 940 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 900 may comprise a near-field communication, NFC, transceiver 950. NFC transceiver 950 may support at least one NFC technology, such as NFC, Bluetooth, Wibree or similar technologies.

Device 900 may comprise user interface, UI, 960. UI 960 may comprise at least one of a display, a keyboard, a touchscreen, a vibrator arranged to signal to a user by causing device 900 to vibrate, a speaker and a microphone. A user may be able to operate device 900 via UI 960, for example to accept incoming telephone calls, to originate telephone calls or video calls, to browse the Internet, to manage digital files stored in memory 920 or on a cloud accessible via transmitter 930 and receiver 940, or via NFC transceiver 950, and/or to play games.

Device 900 may comprise or be arranged to accept a user identity module 970. User identity module 970 may comprise, for example, a subscriber identity module, SIM, card installable in device 900. A user identity module 970 may comprise information identifying a subscription of a user of device 900. A user identity module 970 may comprise cryptographic information usable to verify the identity of a user of device 900 and/or to facilitate encryption of communicated information and billing of the user of device 900 for communication effected via device 900.

Processor 910 may be furnished with a transmitter arranged to output information from processor 910, via electrical leads internal to device 900, to other devices comprised in device 900. Such a transmitter may comprise a serial bus transmitter arranged to, for example, output information via at least one electrical lead to memory 920 for storage therein. Alternatively to a serial bus, the transmitter may comprise a parallel bus transmitter. Likewise processor 910 may comprise a receiver arranged to receive information in processor 910, via electrical leads internal to device 900, from other devices comprised in device 900. Such a receiver may comprise a serial bus receiver arranged to, for example, receive information via at least one electrical lead from receiver 940 for processing in processor 910. Alternatively to a serial bus, the receiver may comprise a parallel bus receiver.

Processor 910, memory 920, transmitter 930, receiver 940, NFC transceiver 950, UI 960 and/or user identity module 970 may be interconnected by electrical leads internal to device 900 in a multitude of different ways. For example, each of the aforementioned devices may be separately connected to a master bus internal to device 900, to allow for the devices to exchange information. However, as the skilled person will appreciate, this is only one example and depending on the embodiment various ways of interconnecting at least two of the aforementioned devices may be selected.

The term "non-transitory" as used herein, is a limitation of the medium itself (i.e., tangible, not a signal) as opposed to a limitation on data storage persistency (e.g., RAM vs. ROM).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

FIG. 10 is a flow graph of a method. The phases of the illustrated method may be performed by a UE, or by a control device configured to control the functioning thereof, when installed therein. The UE may be, for example, the device 310 of FIG. 3, which is configured to perform at least the method 1000. The method 1000 comprises receiving 1010, by a user equipment from a network node, a configuration being indicative of at least: at least one first threshold value for distinguishing between numbers of repetition of transmission; and at least one offset value for the at least one first threshold. The method 1000 comprises measuring 1020 power values of synchronization signal block beams. The method 1000 comprises selecting 1030 a beam based on the measured power values. The method 1000 comprises determining 1040 a number of repetitions of transmission of a first message based on at least a mapping between number of repetitions and power values of synchronization signal block beams, the at least one first threshold value, the at least one offset value, and at least one condition. The method 1000 comprises transmitting 1050, to the network node, the first message using the determined number of repetitions on the selected beam.

FIG. 11 is a flow graph of a method. The phases of the illustrated method may be performed by a network node, e.g. gNB, or by a control device configured to control the functioning thereof, when installed therein. The network node may be, for example, the device 320 of FIG. 3, which is configured to perform at least the method 1100. The method 1100 comprises transmitting 1110, by a network node to a user equipment, a configuration being indicative of at least: at least one first threshold value for distinguishing between numbers of repetition of transmission; and at least one offset value for the at least one first threshold value. The method 1100 comprises receiving 1120, from the user equipment, a first message with a number of repetitions determined based on at least a mapping between number of repetitions and power values of synchronization signal block beams, the at least one first threshold value, the at least one offset value, and at least one set of conditions.

The invention claimed is:

1. An apparatus comprising:
at least one processor; and
at least one memory storing instructions that, when executed by the at least one processor, cause the apparatus at least to perform:
receiving, from a network node, a configuration being indicative of at least one first threshold value for distinguishing between numbers of repetition of transmission, and
at least one offset value for the at least one first threshold value;
measuring power values of synchronization signal block beams;
selecting a beam based on the measured power values;
determining a number of repetitions of transmission of a first message based on at least a mapping between number of repetitions and power values of synchronization signal block beams, the at least one first threshold value, the at least one offset value, and at least one condition; and
transmitting, to the network node, the first message using the determined number of repetitions on the selected beam, wherein the selecting the beam based on the measured power values comprises selecting the beam with the highest power value, and wherein the selected beam is a synchronization signal block beam or a transmit beam of the apparatus.

2. The apparatus of claim 1, wherein the determining the number of repetitions of transmission of the first message comprises at least one of:
determining that a measured power value of the selected beam is greater than a sum of the at least one first threshold value and the at least one offset value; and deciding, based on the determining, to use a first number of repetitions associated with the measured power value of the selected beam; or
determining that the measured power value of the selected beam is less than or equal to the at least one first threshold value; and deciding, based on the determining, to use a second number of repetitions, which is higher than the first number of repetitions; or
determining that the measured power value of the selected beam is greater than the at least one first threshold value and less than or equal to the sum of the at least one first threshold value and the at least one offset value; determining that the at least one condition is fulfilled; and deciding, based on the determining steps, to use the second number of repetitions; or
determining that the measured power value of the selected beam is greater than the at least one first threshold value and less than or equal to the sum of the at least one first threshold value and the at least one offset value; determining that the at least one condition is not fulfilled; and deciding, based on the determining steps, to use the first number of repetitions.

3. The apparatus of claim 1, wherein the measured power value is reference signal received power.

4. The apparatus of claim 1, caused to further perform:
receiving a configuration comprising at least one second threshold value for a difference between a measured power value of the selected beam and a measured power value of another beam having lower power value than the selected beam.

5. The apparatus of claim 1, wherein the at least one condition is from a set comprising:
previous transmission(s) of the first message to the network node have been unsuccessful;
maximum transmit power for transmission of the first message has been reached;
the at least one first threshold value is less than a predetermined value, which defines a limit for redetermination of the number of repetitions;
previous transmission(s) of a radio resource control requests to the network node have been unsuccessful;
difference between a measured power value of the selected beam and a measured power value of another beam having lower power value than the selected beam is greater than a configured second threshold value or greater than a sum of a plurality of configured second threshold values.

6. The apparatus of claim 1, wherein the first message is a random access request message.

7. The apparatus of claim 6, wherein the selected beam is the beam with the highest measured power value, and the another beam is the beam with the second highest measured power value.

8. The apparatus of claim 1, caused to further perform:
detecting that transmission of the first message or a radio resource control request is unsuccessful;

increasing the at least one offset value to obtain an updated offset value; and re-performing the determination of the number of repetitions using the updated offset value to obtain a re-determined number of repetitions;

transmitting the first message using the re-determined number of repetitions.

9. The apparatus of claim 8, caused to further perform:

increasing the at least one offset value based on a number of detected unsuccessful transmissions of the first message or of the radio resource control request.

10. The apparatus of claim 8, caused to further perform:

increasing the at least one offset value until receiving a response to the first message or to the radio resource control request from the network node.

11. The apparatus of claim 8, caused to further perform:

receiving a configuration comprising a third threshold value defining a maximum number of unsuccessful transmissions of the first message or of the radio resource control request; and increasing the at least one offset value until number of unsuccessful transmissions of the first message or of the radio resource control request reaches the third threshold value.

12. The apparatus of claim 8, caused to further perform:

detecting that transmission of the first message or the radio resource control request has been unsuccessful a number of times which is greater than a third threshold value; and repeating transmission of the first message or the radio resource control request using a latest determined number of repetitions until receiving a response to the first message or to the radio resource control request.

13. An apparatus comprising:

at least one processor; and at least one memory storing instructions that, when executed by the at least one processor, cause the apparatus at least to perform:

transmitting, to a user equipment, a configuration being indicative of at least:

at least one first threshold value for distinguishing between numbers of repetition of transmission; and at least one offset value for the at least one first threshold value;

receiving, from the user equipment, a first message with a number of repetitions determined based on at least a mapping between number of repetitions and power values of synchronization signal block beams, the at least one first threshold value, the at least one offset value, and at least one set of conditions, the apparatus caused to further perform:

transmitting a configuration comprising at least one second threshold value for a difference between a measured power value of a selected beam of the user equipment and a measured power value of another beam of the user equipment having lower power value than the selected beam of the user equipment.

14. The apparatus of claim 13, wherein the measured power value is reference signal received power.

15. The apparatus of claim 13, wherein the selected beam of the user equipment is the beam with the highest measured power value, and the another beam of the user equipment is the beam with the second highest measured power value.

16. The apparatus of claim 13, wherein the at least one condition is from a set of:

previous transmission(s) of the first message from the user equipment have been unsuccessful;

maximum transmit power for transmission of the first message of the user equipment has been reached;

the at least one first threshold value is less than a predetermined value, which defines a limit for redetermination of the number of repetitions;

previous transmission(s) of a radio resource control requests from the user equipment have been unsuccessful;

difference between a measured power value of the selected beam of the user equipment and a measured power value of another beam of the user equipment having lower power value than the selected beam of the user equipment is greater than a configured second threshold value or greater than a sum of a plurality of configured second threshold values.

17. The apparatus of claim 13, wherein the first message is a random access request message.

18. A method, comprising:

receiving, by a user equipment from a network node, a configuration being indicative of at least one first threshold value for distinguishing between numbers of repetition of transmission; and at least one offset value for the at least one first threshold;

measuring power values of synchronization signal block beams;

selecting a beam based on the measured power values;

determining a number of repetitions of transmission of a first message based on at least a mapping between number of repetitions and power values of synchronization signal block beams, the at least one first threshold value, the at least one offset value, and at least one condition; and transmitting, to the network node, the first message using the determined number of repetitions on the selected beam, the method further comprising:

receiving a configuration comprising at least one second threshold value for a difference between a measured power value of the selected beam and a measured power value of another beam having lower power value than the selected beam.

* * * * *